UNITED STATES PATENT OFFICE.

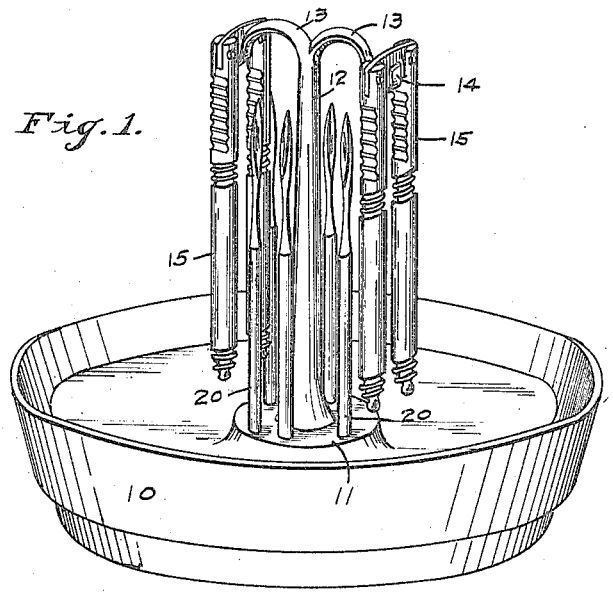
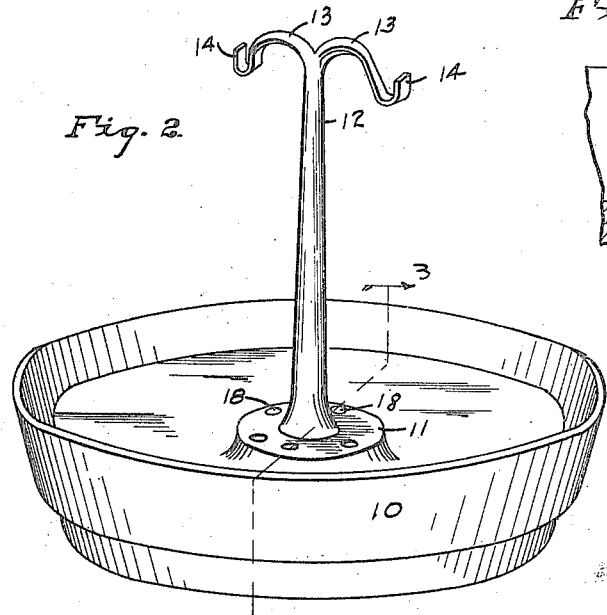
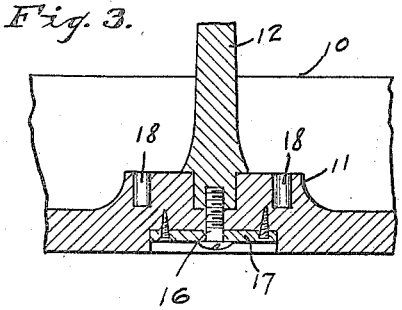

HULBERT J. SMITH, OF INDIANAPOLIS, INDIANA.

NUT-BOWL.

1,257,644.   Specification of Letters Patent.   Patented Feb. 26, 1918.

Application filed May 17, 1915. Serial No. 28,641.

*To all whom it may concern:*

Be it known that I, HULBERT J. SMITH, a citizen of the United States, and a resident of Indianapolis, county of Marion, and State of Indiana, have invented a certain new and useful Nut-Bowl; and I do hereby declare that the following is a full, clear, and exact description thereof, reference being had to the accompanying drawings, in which like letters refer to like parts.

The object of this invention is to provide a nut bowl with means for removably holding the nut crackers and nut picks in vertical position so that they will be disengaged from the nuts in the bowl and will stand up in an ornamental position and will be readily accessible.

One feature of the invention consists in combining with a nut bowl, a central upwardly extending post with laterally extending arms thereon upon the ends of which nut crackers may be suspended. Associated with the foregoing is the provision of a series of holes in the bowl around said post in which the ends of the nut picks may be inserted so as to hold the said nut picks in vertical position.

The full nature of the invention will be understood from the accompanying drawings and the following description and claim.

In the drawings, Figure 1 is a perspective of the device with nut picks and nut crackers associated therewith. Fig. 2 is a perspective view thereof with the nut crackers and nut picks omitted. Fig. 3 is a section on line 3—3 through a part of the device.

There is shown herein a wooden nut bowl 10 with a central upwardly extending boss 11 having in it a centrally located recess for receiving the lower end or shank of a metal post 12 which projects upwardly therefrom and at its upper ends has oppositely extending curved arms 13 with upwardly turned hooks 14 on their outer ends. Said hooks 14 are arranged so that nut crackers 15 may be suspended therefrom and the lower ends of the nut crackers will extend almost down to the bowl. The post 12 is held from escape by a screw 16 extending through a plate 17 in the bottom of the bowl, said screw extending also through said bowl and screwing into the lower end of the post.

A series of holes 18 are made in the boss 11 around the lower end of the post 12 in which the ends of nut picks 20 may be inserted and whereby said picks will be held in vertical position and in a circle surrounding the post and between the nut crackers.

This makes a very convenient nut bowl with the nut crackers and nut picks held in a conspicuous and attractive position and so as to be very accessible and kept apart from the nuts in the bowl and kept out of the bowl and away from the nuts therein.

The invention claimed is:

The combination of a nut bowl having an upwardly extending boss at its axial center, said boss having a central recess in its upper end and said bowl having a central recess in its lower face, a post having a shank at its lower end adapted to enter the central recess in said boss, a plate entered in the recess in the lower face of the bowl, means to hold the plate in said recess, a screw extending through said plate and bowl and threaded into said shank, the upper face of said boss having a plurality of radially arranged vertically extending holes therein for the reception of nut picks, and horizontally extending arms integral with the upper end of said post having their free ends formed into hooks for the reception of nut crackers.

In witness whereof, I have hereunto affixed my signature in the presence of the witnesses herein named.

HULBERT J. SMITH.

Witnesses:
J. H. WELLS,
R. G. LOCKWOOD.

Copies of this patent may be obtained for five cents each, by addressing the "Commissioner of Patents, Washington, D. C."